Patented May 6, 1941

2,241,235

UNITED STATES PATENT OFFICE 2,241,235

SULPHOCARBOXYLIC ACID ESTERS OF CELLULOSE

Gustave B. Bachman, Rochester, N. Y., assignor to Eastman Kodak Company, Rochester, N. Y., a corporation of New Jersey No Drawing. Application August 15, 1939, Serial No. 290,229

5 Claims. (Cl. 260—224)

This invention relates to sulphocarboxylic acid esters of cellulose and a process for the preparation of such esters.

Cellulose derivatives have been prepared containing sulpho groups. However, in every case the sulpho compound used for esterifying the cellulose has depended for its acidity upon the sulpho group alone. Nowhere has the preparation of esters of sulphocarboxylic acids with celluose been taught.

One object of my invention is to provide a process for combining the acid radical of a sulphocarboxylic acid with a cellulose derivative. Another object of my invention is to provide a sulpho containing derivative of cellulose which may be employed for the preparation of salts both of the inorganic and the organic bases.

I have found that the sulphocarboxylic acid esters of cellulose may be prepared by reacting upon cellulose with the acid anhydride in the presence of pyridine. There results a product which is a water-soluble salt of pyridine and which can be converted into the free acid or to salts of other bases.

As sulphocarboxylic acids are few in number and as sulphobenzoic acid is representative of the action of acids of this type which contain both carboxylic and sulphonic acid groups, the following example illustrates the action of this type of acid.

Example

A mixture of 15 parts of a hydrolyzed cellulose acetate having an acetyl content of 30.5% was mixed with 10 parts of sulphobenzoic anhydride and 90 parts of pyridine. The mixture was heated for three hours at approximately 100° C. 10 parts of sulphobenzoic anhydride was then added and the heating was repeated. A third portion of 10 parts of anhydride was added and the mass was maintained for a further three hours at approximately 100° C. The product obtained at this point was water-soluble. 90 parts of pyridine was added and the mixture was cooled. On standing for approximately 12 hours pyridine sulphobenzoate separated as crystals. The supernatant liquid was poured into water to give a clear solution. Addition of sufficient dilute hydrochloric acid to combine with the pyridine forming a salt of the cellulose ester, precipitated the free acid sulphobenzoate. A solution of barium chloride was added and the cellulose ester was precipitated in the form of its barium salt. This product was analyzed and showed an acetyl content of 30.1% and an ash content of 15.6% which was due to the barium sulphate present. This ash corresponds to a sulphobenzoate content of approximately 27%.

It may be seen from the example that a substantial amount of sulpho acid groups, such as 10% or more must be present in the cellulose ester to impart water solubility. Also, the salt must be in a form which is water-soluble in order to assure good precipitation.

Cellulose acetate which has been hydrolyzed down to 37 to 40% acetyl is the preferred starting material for the process of my invention. Nevertheless, other cellulose derivatives having a worth while number of free and esterifiable hydroxyl groups may be employed as the starting material if desired. Instead of pyridine some other tertiary organic base may be employed in the reaction, such as quinoline and α-picolin.

The sulphocarboxylic acid esters of cellulose prepared in accordance with my invention are particularly suited for combining with bases of various types particularly to form water-soluble materials. For instance, they may be combined in the form of the acid ester with alkali metal compounds, such as sodium carbonate sodium bicarbonate, or ammonium hydroxide. They may also be combined with organic bases as illustrated by the example in which the pyridine salt is the product of the esterification process. Other bases, such as triethanolamine or ethanolamines or primary or secondary amines will form salts with my cellulose esters in the acid form, just as these bases will form salts with other compounds of an acidic nature. These esters will also combine with inorganic bases which form water-insoluble salts as illustrated in the example where the barium salt was formed. The cellulose derivatives which I have prepared are especially suitable for use where water-soluble cellulose derivatives are formed which need is supplied by the water-soluble salt of the ester.

Instead of the acetate other cellulose derivatives having free and available hydroxyl groups may be employed, such as lower fatty acid esters of cellulose, generally, having free hydroxyl groups or cellulose ethers of this type. If desired, a cellulose acetate, such as described in Fordyce Patent No. 2,129,052, granted September 6, 1938, having a considerable number of free hydroxyl groups may be employed as the starting material of my process.

What I claim is:

1. A cellulose compound containing sulphobenzoyl groups.

2. Cellulose acetate-sulphobenzoate.

3. The process of preparing a cellulose compound containing the acid radicals of a sulphocarboxylic acid which comprises reacting a cellulose derivative containing free and esterifiable hydroxyl groups with a reaction mixture essentially consisting of the anhydride of the sulphocarboxylic acid and a tertiary organic base.

4. The process of preparing a cellulose acetate sulphobenzoate which comprises reacting cellulose acetate containing free and esterifiable hydroxyl groups with a reaction mixture essentially consisting of sulphobenzoic anhydride and pyridine.

5. Cellulose acetate sodium sulphobenzoate.

GUSTAVE B. BACHMAN.